(No Model.) 3 Sheets—Sheet 2.
A. BODDING.
APPARATUS FOR DRAWING MAPS AND PLOTS OF GROUND.
No. 484,905. Patented Oct. 25, 1892.
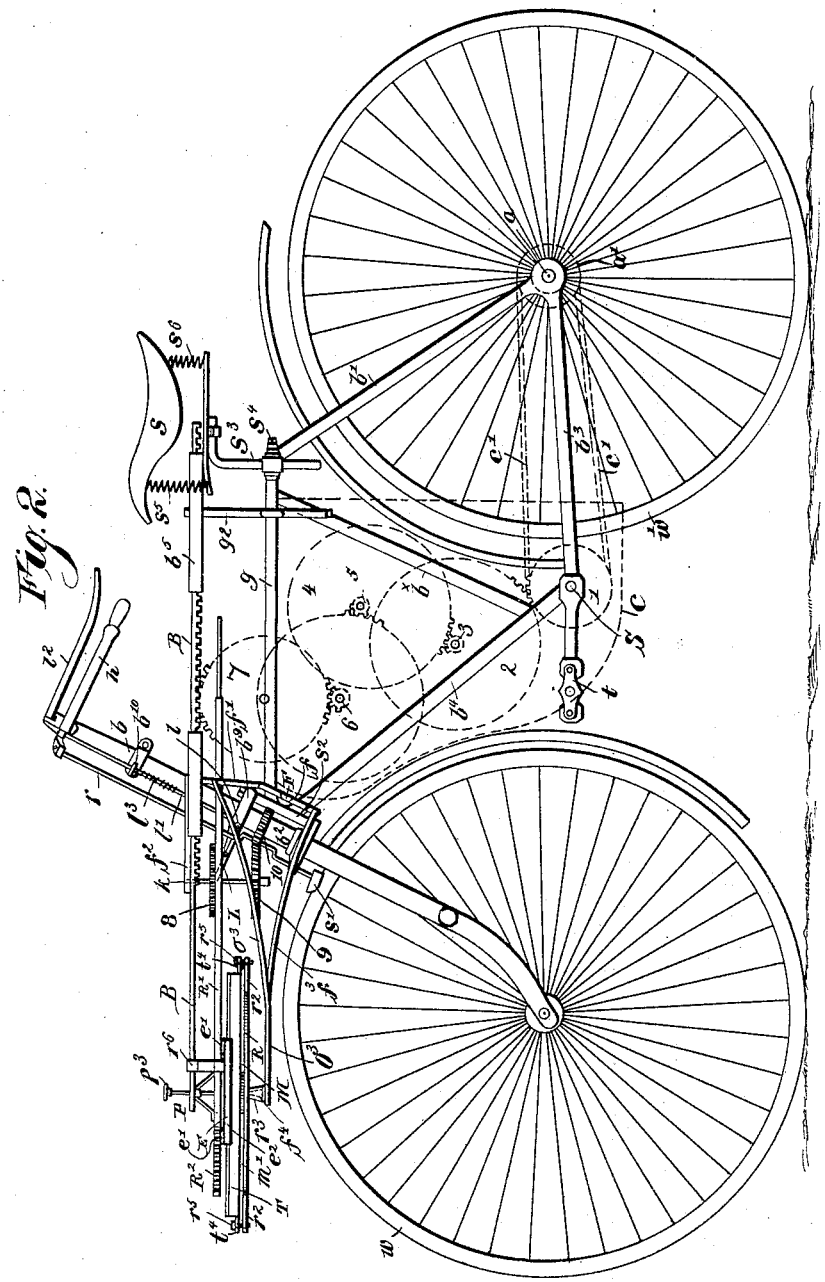

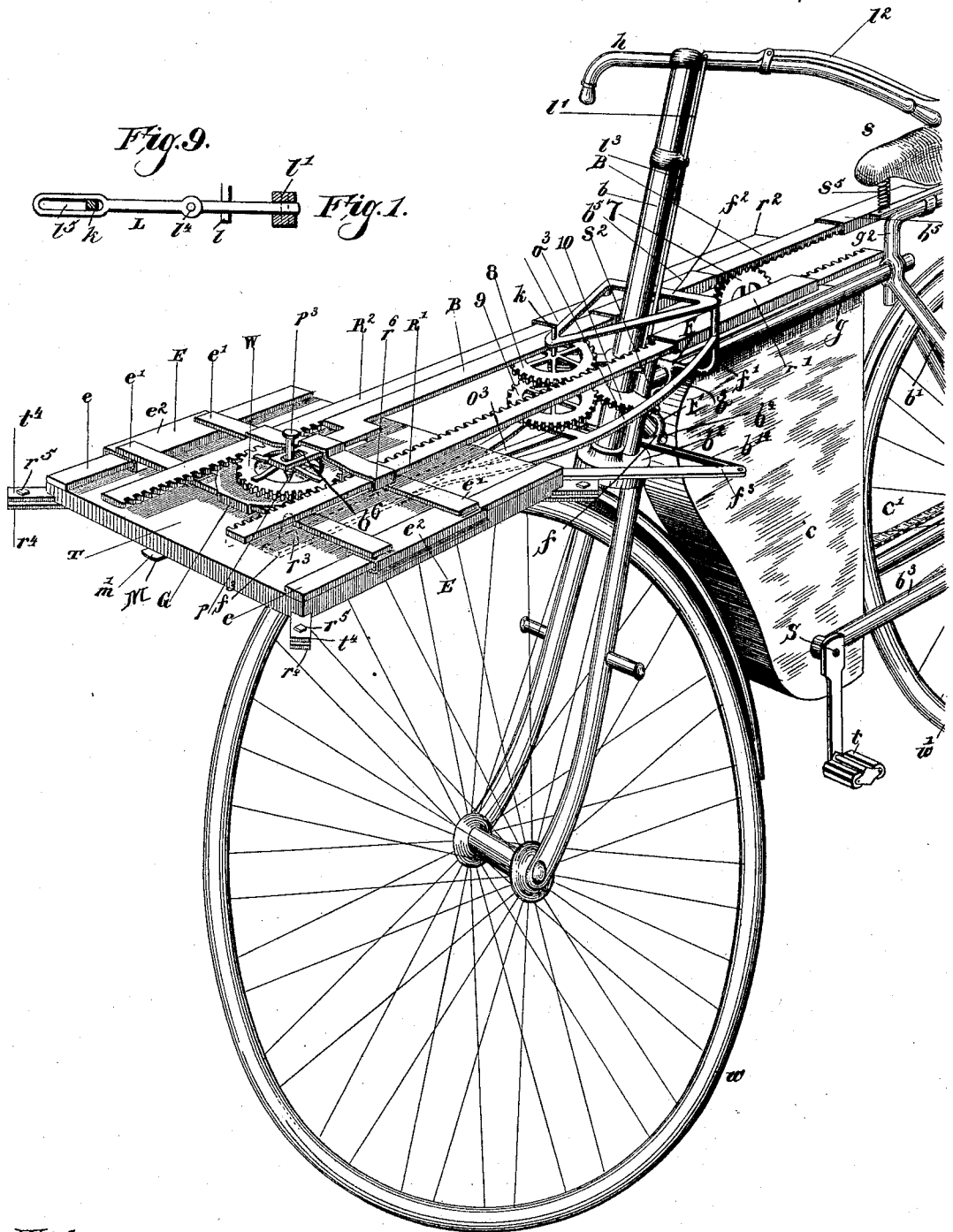

(No Model.) 3 Sheets—Sheet 3.
A. BODDING.
APPARATUS FOR DRAWING MAPS AND PLOTS OF GROUND.
No. 484,905. Patented Oct. 25, 1892.
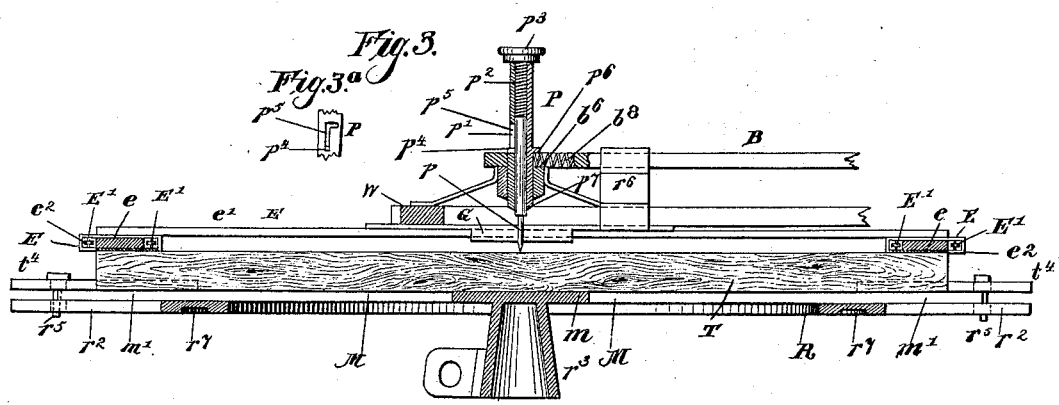
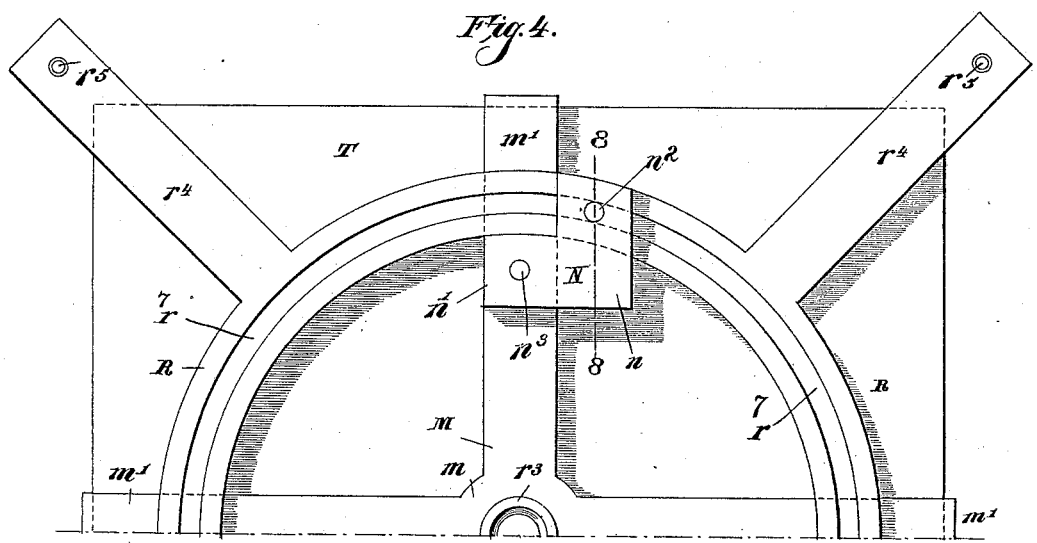
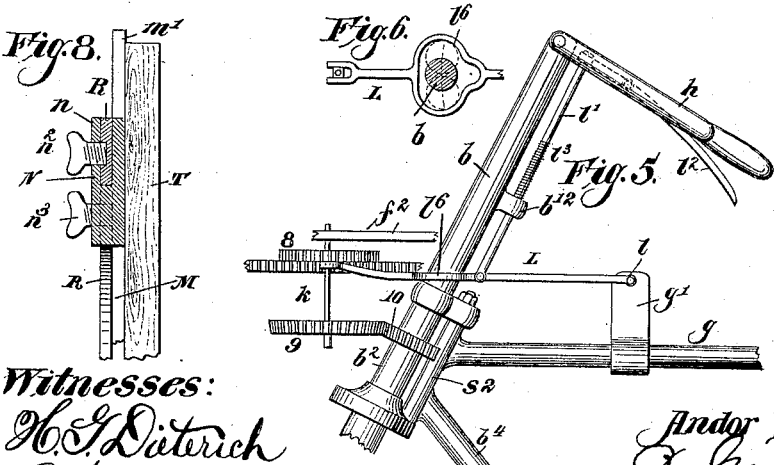
Witnesses:
H. G. Dieterich
B. W. Sommers
Inventor:
Andor Bodding.
By [signature]
Atty.

UNITED STATES PATENT OFFICE.

ANDOR BODDING, OF DRAMMEN, NORWAY.

APPARATUS FOR DRAWING MAPS AND PLOTS OF GROUND.

SPECIFICATION forming part of Letters Patent No. 484,905, dated October 25, 1892.

Application filed November 10, 1891. Serial No. 411,484. (No model.) Patented in Norway February 26, 1891, No. 2,108.

*To all whom it may concern:*

Be it known that I, ANDOR BODDING, a subject of the King of Norway, residing at Drammen, in the county of Drammen and Kingdom of Norway, have invented certain new and useful Improvements in Apparatus for Drawing Maps and Plans, (for which I have obtained Letters Patent in Norway, No. 2,108, dated February 26, 1891;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention has relation to mapping or plotting instruments or apparatus, and has for its object the provision of means whereby the plotting is effected by a revoluble element caused to travel over the ground to be plotted or mapped.

This invention consists in mechanism and co-operating mechanisms and structural features and in their combination with a vehicle, whereby the objects of my said invention are attained, as will now be fully described, reference being had to the accompanying drawings, in which—

Figure 1 is a perspective view illustrating my invention in its application to a bicycle, of which sufficient only is shown to clearly illustrate such application. Fig. 2 is a side elevation of the bicycle and plotting-instrument combined therewith. Fig. 3 is a sectional view of the mapping or plotting board or table and the style, tracer, pen, or pencil, its holder, and part of the carrier for said holder. Fig. 3ᵃ is a detail view. Fig. 4 is an under side view of one-half of the mapping or plotting board or table and its supports. Fig. 5 is a detail elevation illustrating a modification of the mechanism for positioning the mapping or plotting board or table from the steering-bar. Figs. 6 and 7 are detail views thereof. Fig. 8 is a detail section taken on line 8 8 of Fig. 4, and Fig. 9 is plan view of a shifting-lever for throwing the rack-bars in and out of gear with the driving-gearing.

The same symbols are employed to indicate the same or like parts wherever such may occur in the various figures of drawings just described.

In the description of my invention which is to follow, in order to avoid repetition the mapping or plotting table or board will be denominated as the "plotting-table," and inasmuch as a style, tracer, pen, or pencil may be employed, according to the material used for plotting, and as said elements are substantial equivalents they will be referred to as the "pencil." I have chosen a bicycle in the application of my invention to an element adapted to travel over the ground to be mapped or plotted and have illustrated the pencil as being operated by the driving element of the vehicle, and I have also shown mechanism adapted to be operated from the steering-bar for varying the position of the plotting-table relatively to changes in the direction of motion of the vehicle. I desire it to be understood, however, that my invention may be applied to other styles of vehicles or carriers and that the positioning of the plotting-table need not necessarily be effected through the medium of the steering-bar.

The essential elements of the bicycle are or may be of any well-known or preferred construction. $w$ and $w'$ indicate the steering and driving wheels, respectively, and the saddle and plotting-table, as well as the operating devices, are mounted on or in a suitable framework supported from the said wheels, $b$, indicating the steering-bar connected, as usual, with the steering-wheel; $s^2$, the steering-bar pivot; $h$, the steering-handle; $r$, the brake-rod, and $s'$ the brake-shoe, (see Fig. 2,) the brake-lever (not shown) being arranged as usual. The framing that supports the plotting-table, the saddle, and the operating devices consists of two angle-stays, one on each side of the drive-wheel $w'$ and loosely mounted on the axle $a$ thereof. The inclined arms $b'$ of these stays converge and unite at a point above the drive-wheel, at which point is formed an eye for the longitudinal girt $g$ and an angle-arm, to which is secured the supporting-bar for the saddle $s$, to which bar the springs $s^5$ $s^6$, that support the saddle, are secured, as shown in Figs. 1 and 2. In practice I prefer, however, to make the saddle adjustable by forming a bearing at the point of junction of the stay-arms $b'$, and the longitudinal girt for the saddle-bar $s^3$, that is adjustable in said bearing by means of a set screw or bolt $s^4$, as shown in Fig. 2. The forward end of the longitudinal girt is secured to the steering-bar pivot $s^2$, and to said pivot is also secured one end of an inclined brace-rod $b^4$, whose opposite end supports the driving-spindle S, said driving-spindle being mounted in the outer end of the horizontal arms $b^3$ of the angle-stays, a diagonal brace $b^\times$ bracing the rod $b^4$ to the longitudinal girt $g$. (See Fig. 2.)

The parts described constitute the main framing of the vehicle.

The auxiliary framing comprises a frame F, composed of a standard $f$, having an eye at each end for passage of the longitudinal girt $g$ and the supporting-rod $b^4$, a yoke $f'$ on the upper eye, to the vertical arms of which is secured a triangular frame $f^2$, through which passes the steering-bar, and two arms $b^{14}$ extending laterally from the lower eye of the standard $f$, to which is pivoted one end of two braces $f^3$ for a reach $O^3$, whose rear end is forked, the arms $o^3$ of which fork are secured to or formed on the vertical arms $f'$ of the auxiliary frame F. The reach $O^3$ extends forwardly over the steering-wheel $w$ and has at its outer end a conical journal $f^4$, that has its bearing in a socket $r^3$, secured to the under side of a frame M, that serves as a support for the plotting-table T, the axis of the journal and socket bearing lying in the plane of the vertical axis of the pencil, so that the table-support M is revoluble about the pencil irrespective of the position of the table on said support. This supporting-frame M, Fig. 4, consists of a central discoidal portion or hub $m$, in which is formed or to which is secured the journal-bearing $r^3$, and of radial arms $m'$, preferably four, extending from the hub $m$ and projecting slightly beyond the edges of the table T. With the frame M is connected an adjusting and locking device in the form of a ring R, provided with four radial arms $r^4$, whose outer ends are provided with a pin or bolt hole for the locking-bolts $r^5$, by means of which the table T is locked to the ring, said bolts or pins passing through lugs or arms $t^4$, projecting from the corners of the said table. The ring R is locked to the frame M by means of a clamp or clamps N, Figs. 4 and 8, of a substantially-rectangular form, the arm $n$ being slotted for the reception of the ring R, to which it is locked by a binding or clamping screw $n^2$, extending into an annular groove $r^7$ in the under side of the ring, while the arm $n'$ of the clamp is adapted to lap over one of the arms $m'$ of frame, to which it may be locked by a binding-screw $n^3$.

It will be seen that by loosening both binding-screws $n^2 n^3$ and by removing the locking-pins $r^5$ the table T can be displaced relatively to the frame M and ring R, or both the table T and frame M can be reciprocally adjusted and revolved independently of the ring to the desired position, when said parts may again be locked together by means of the pins $r^5$ and revolved together; but said parts are locked against rotation when the clamps N are moved up to one of the radial arms of the frame M and clamped thereto, which is the case whenever the bicycle is traveling in a straight line.

Upon the driving-spindle S is mounted a sprocket-wheel (not shown) that is connected, as usual, by a chain $c'$ with a like wheel $a'$ on the drive-wheel axle $a$, as shown in dotted lines in Fig. 2, and upon said driving-spindle is also secured a gear-wheel 1, that imparts motion to the pencil through the medium of a proportional gearing 2, 3, 4, 5, 6, and 7, Fig. 2, the said gearing being so proportioned as to move the pencil one foot for every ten thousand feet traveled over by the bicycle. Although I have found this a convenient portion or ratio, I do not desire to limit myself thereto.

The proportional gearing, for obvious purposes, is inclosed in a casing or housing $c$, as shown in Fig. 1, secured to the framing.

The terminal or transmitting wheel 7 of the proportional gearing imparts a rectilinear motion to the pencil $p$, whose holder is supported from a carrier-bar B, that has free motion in guides $b^5 b^5$, Figs. 1 and 2, secured to a vertical standard $g^2$ on the longitudinal girt $g$, (see Fig. 1,) or to the framing in any other desired manner, the rear portion of said bar being toothed and gearing with the transmitting-wheel 7 of the proportional gearing.

The carrier rack-bar B extends along the steering-bar $b$ and has its forward end bent so that the bearing for the pencil-holder will lie in a plane parallel with the longitudinal axis of the bicycle.

The holder P for the pencil, Fig. 3, has its bearing in a longitudinal slot $b^6$, formed in the outer end of the carrier rack-bar B, and is held to the forward end of said slot by a spring $b^8$, for purposes hereinafter to be described. The pencil $p$ is inclosed in a tube $p'$, that has at its upper end a button $p^3$ and carries a spring $p^2$, that tends to force the tube downward in contact with the table T or the paper thereon, said tube having a radial pin $p^4$, that projects into a vertical slot $p^5$, formed in the holder P, the upper end of said slot merging into a lateral or circumferential branch slot, as shown in Fig. 3$^a$, so that when the pencil-tube $p'$ is lifted to bring its pin in register with the circumferential branch of the slot and turned into it said pencil-tube and pencil will be held out of contact with the table T.

The holder P has a seat-flange $p^6$ that straddles the slot $b^6$, and the lower portion of said holder is of increased diameter to form a bearing $p^7$ for the hub of a gear-wheel W, that is in perpetual gear with two rack-bars $R' R^2$, whose rear ends slide in guides $r'$ and $r^2$, secured to the auxiliary framing F, or to any other portion of the framing of the machine, the forward end of said rack-bars having motion in the arms of a guide strap or bracket $r^6$, secured to the forward end of the carrier rack-bar B.

To the opposite sides of the table T is secured a rail $e$, on which is mounted a carriage or slide E, composed of two slide-bars $e^2$, rigidly connected by two cross-bars $e'$ $e'$, on which cross-bars is mounted a second carriage G, composed of two slides and a ring connecting the same, and to said ring is rigidly secured the directing-wheel W, above referred to, so that whenever a partial revolution is imparted to said wheel through the rack-bars and mechanism presently to be described a corresponding partial revolution will be imparted to the table and its support, provided said table is disconnected from the adjusting-ring R.

In order to reduce the friction of the carriage E on the rails $e$, the sliding bars $e^2$ are preferably provided with rollers E', as shown in Fig. 3, and similar rollers may be provided for the carriage G.

Normally the rack-bars R' R² move idly in opposite directions as the pencil-carrier B moves forward, and the directing-wheel W is revolved by such forward movement. When, however, the bicycle changes its direction of motion it becomes necessary to correspondingly change the position of the table and to bring the same back again to its former position as soon as the direction of motion of the bicycle has been changed. This may be effected by hand through the medium of a gear-wheel adapted to be brought into engagement with the rack-bars R' R², and the necessary revolutions imparted to the wheel W to swing the table T on its pivot in proportion to the swing of the steering-wheel $w$. Inasmuch, however, as this swinging motion must exactly correspond with that of the steering-wheel in order to plot correctly, I prefer to impart this partial rotation to the wheel W through the medium of the steering-bar $b$. To this end a toothed sector 10 is secured to the steering-bar that may be in perpetual gear with a wheel 9 on a vertical spindle $k$, the upper portion of which is squared and has loosely mounted on said squared portion a gear-wheel 8, that is adapted to mesh with the rack-bars R' R², but is normally held out of engagement therewith by means of a lever L, Fig. 9. This lever is constructed of two parts hinged together at $l^4$ and fulcrumed at $l$ in rear of the hinge-joint to the strap $b^9$, that connects the steering-bar $b$ with its pivot $s^2$. (See Fig. 2.) The forward end of the lever L has a longitudinal slot $l^5$, through which passes the squared portion of the spindle $k$. Some such construction is necessary in order to permit the swinging of the steering-bar $b$ to one or the other side, according to the direction it is desired to give to the bicycle, and it is obvious that as the bar is turned or swung into one or the other direction the forward end of the lever L will swing on its pivot and move backward and forward on the spindle $k$ in proportion to the arc described by the lever-fulcrum with the steering-bar strap, the slot $l^5$ serving practically as a means for lengthening or shortening the forward arm of the lever L. The rear end of the lever L is pivoted to one end of a connecting-rod $l'$, (see Fig. 9,) whose upper end is connected with an actuating-lever $l^2$, fulcrumed to the upper end of the steering-bar $b$, (see Fig. 2,) and the said rod $l'$ passes through a guide-lug $b^{10}$ on the said bar and carries a spring $l^3$, whose upper end has a bearing on the lug and whose lower end is secured to the rod, so as to force the rear end of the lever down, thereby holding the wheel 8 up and out of gear with the rack-bars R' R². Of course when the lever $l^2$ is depressed the wheel 8 is lowered into gear with the rack-bars, and when the steering-bar is turned the wheel 8 is also turned through the gears 10 and 9. The gear 9 is so proportioned and arranged on the steering-bar $b$ as that its center will coincide with the vertical axis of the steering-bar pivot $s^2$, so that the wheel 10 will have its proper partial rotation imparted thereto.

It is obvious that instead of mounting the gear-wheel 8 loosely on the spindle $k$ the said wheel may be rigidly secured thereto and the spindle $k$ mounted loosely in its bearings in the triangular frame $f^2$ and in a cross-bar of the reach $O^3$, so that both wheels 8 and 9 may be lifted out of and lowered into gear with the rack-bars R' R² and the sector 10, respectively.

Although the described mechanism for imparting to the rack-bars R' R² a reciprocal motion is very convenient and effective, I prefer the arrangement and construction of devices shown in Figs. 5, 6, and 7, in which the lever L is fulcrumed at its rear end to a lug or bracket $g'$ on the longitudinal girt $g$, and said lever has a bow or opening $l^6$, Fig. 6, through which the steering-bar $b$ passes, said opening being of sufficient diameter to allow of the proper swinging motion of the steering-bar. The lever L is here connected with the rod $l'$ in front of its fulcrum. Hence the spring $l^3$ is so arranged as to force the forward end of the lever, together with the wheel 8, up, in order to hold said wheel out of engagement with the said rack-bars R' R². In this arrangement the actuating-lever $l^2$ can be pivoted to one side of the long arm of the steering-handle $h$, whereby said lever and the brake-lever may be brought within the grasp of one hand of the rider; but in order to allow the steering-bar to swing properly it is necessary that the rod $l'$ should be so connected with the actuating-lever as to revolve in its bearing in said lever, as shown in Fig. 7.

From the above description the operation of the mechanism will be fully understood and will therefore need but a few general remarks.

Before starting the pencil-carrier rack-bar B is positioned so that the point $p$ will start the plotting at a given point of and proximate to the rear edge of the table T, according to the approximate distance to be traveled over. This is done by revolving the drive-wheel backward sufficiently for the purpose. The rider now mounts the bicycle, and as long as he travels in a substantially-straight line the pencil-carrier and pencil $p$ will move forward in the same direction. If it becomes necessary to change the direction of motion of the bicycle, the ring R is disconnected from the arms of the frame M by loosening both clamping-screws $n^2$ $n^3$, and before the steering-bar $b$ is turned the wheel 8 is brought into gear with the rack-bars $R'$ $R^2$. If the steering-bar is now turned, the rack-bars $R'$ $R^2$ will reciprocally move and impart a partial revolution to the directing-wheel W in a direction the reverse of that of the motion of the steering-bar $b$. Immediately after the turning of the bicycle into the new direction the wheel 8 is moved out of gear with the rack-bars, as described, and the steering bar and wheel are turned back to a straight course. As the drive-wheel $w'$ follows the lead of the steering-wheel $w$, the entire framing, together with the reach $O^3$, that supports the table T, is swung around, the arc described by the framing being equal to that described by the steering-bar and wheel on their pivot $s^2$, thereby swinging the table T and its supporting-frame M back again to the position from which they were moved by the directing-wheel W, and as the rack-bars $R'$ $R^2$ are not now in gear with the wheel 8 said bars will move idly in opposite directions. The supporting-frame M is now locked to the ring R by means of the clamps N and clamping-screws $n^2$ $n^3$ and the bicycle is started in the new direction. In turning, however, the pencil-carrier rack-bar B is moved forward a distance corresponding with that traveled over by the bicycle, and inasmuch as the pencil was locked against motion with said bar by the rack-bars $R'$ $R^2$ and the wheels W and 8, said rack-bar in moving forward compresses the spring $b^8$, the pencil-holder remaining stationary in its slot, so that as soon as the wheel 8 is moved out of gear with the rack-bars, allowing them idle motion, the said spring $b^8$ will force the pencil-holder to the forward end of the slot $b^6$ in the carrier rack-bar B, and will thus move over the board a distance equal to that traveled over by the bicycle in changing the direction of its course.

Having thus described my invention, what I claim as new therein, and desire to secure by Letters Patent, is—

1. In a plotting-instrument, the combination of a vehicle, a pencil, a plotting-table, means to rotate the same about the vertical axis of the pencil, and gearing driven from a revoluble element of the vehicle and adapted to impart a rectilinear motion to the pencil over the plotting-table, for the purposes set forth.

2. In a plotting-instrument, the combination of a vehicle, a pencil, a plotting-table, means to rotate the same about the vertical axis of the pencil on an independent pivot, and gearing driven from a revoluble element of the vehicle, adapted to impart a rectilinear motion to the pencil, for the purposes set forth.

3. In a plotting-instrument, the combination of a vehicle having a revoluble steering-bar, a pencil, a plotting-table adapted to revolve about the vertical axis of the pencil, and gearing operated from the steering-bar, adapted to revolve the table about the pencil when the said steering-bar is revolved to change the direction of motion of the vehicle, for the purposes set forth.

4. In a plotting-instrument, the combination, with a vehicle, the steering-wheel thereof, and a revoluble steering-bar for said wheel, of a plotting-table adapted to revolve on a vertical journal supported from the drive wheel or wheels of the vehicle, and gearing driven from the steering-bar and adapted to revolve the plotting-table in a direction the reverse of that of the steering-bar, and means for disengaging the steering-bar from the gearing, for the purposes set forth.

5. In a plotting-instrument, the combination, with a vehicle, the steering-wheel thereof, and a revoluble steering-bar for said wheel, of a plotting-table mounted on a vertical pivot supported from the drive wheel or wheels of the vehicle, a pencil about the vertical axis of which said table is adapted to revolve, and gearing operated from the steering-bar for imparting a partial revolution to the table about the pencil, for the purposes set forth.

6. In a plotting-instrument, the combination, with a vehicle, the steering-wheel thereof, and a revoluble steering-bar for said wheel, of a plotting-table mounted on a vertical pivot supported from the drive-wheel of the vehicle, a pencil about the vertical axis of which said table is adapted to revolve, gearing operated from the steering-bar for imparting a partial revolution to the table about the pencil, and gearing driven from a revoluble element of the vehicle and adapted to impart to the pencil a rectilinear motion over the table, for the purposes set forth.

7. The combination of a bicycle with a plotting or mapping apparatus comprising a plotting-table adapted to revolve on a vertical journal supported from the drive-wheel of the vehicle, a pencil adapted to move over the table in the direction of motion of the vehicle, and gearing operated from the steering-bar of the vehicle and adapted to revolve the plotting-table when said bar is turned to change the direction of motion of the vehicle.

8. The combination, with a bicycle, its steering-wheel and bar, and a toothed sector on said bar, of a plotting-table adapted to revolve on a vertical journal supported from the drive-wheel of the vehicle, gearing connecting the table with the toothed sector on the steering-bar and adapted to revolve said table in a direction opposite to that of the steering-bar, and shifting devices for shifting the gearing out of gear with the toothed sector, for the purposes set forth.

9. In a plotting-instrument, the combination of a vehicle, a plotting-table adapted to revolve on a vertical journal supported thereon, a pencil-carrier and gearing driven from a revoluble element of the vehicle and adapted to impart a rectilinear motion to said carrier over the plotting-table with a pencil extending through a longitudinal slot in the carrier, a spring to hold said pencil at the outer end of said slot, a gear-wheel connected with the table and adapted to revolve about the pencil, two rack-bars in gear with the wheel on opposite sides, and a sliding connection between the rack-bars and the pencil-carrier, for the purpose set forth.

10. The table T, the carriages E and G, having motion thereon in opposite directions, and a pencil having a rectilinear motion over the table, in combination with the frame M, having an axial journal-bearing, the ring R, having an annular groove $r^7$, and radial arms adapted to be locked to the table T and the clamp N, said parts being arranged for co-operation substantially as and for the purpose set forth.

11. The table T, the carriages E and G, having motion thereon in opposite directions, the wheel W, secured to the carriage G, the frame M, having an axial journal-bearing, the ring R, provided with an annular groove, the clamp N, adapted to lock the ring to the frame M, and means for locking the ring R to the table T, in combination with a pencil-carrier having a rectilinear motion over the table, a pencil connected with the carrier and arranged axially of the wheel W, two rack-bars in gear with the wheel W on opposite sides, and guides for said rack-bars, connected with the pencil-carrier, for the purpose set forth.

12. The combination, with a bicycle and its steering-bar provided with a toothed sector, of the plotting-table T, the carriages E and G, having motion on the table in opposite directions, the wheel W, secured to the carriage G, the table-supporting frame M, provided with an axial bearing, a journal for said bearing supported above the steering-wheel from the drive-wheel axle, the adjusting-ring R, provided with an annular groove and adapted to be locked to the plotting-table T, a locking device for locking the adjusting-ring to the supporting-frame, two rack-bars engaging the wheel W on opposite sides, a pencil-carrier adapted to move in a rectilinear direction over the plotting-table, guides secured to the carrier in which the rack-bars have motion, a pencil supported in a longitudinal slot in the carrier, a spring to normally hold said pencil in the forward end of the slot, said pencil extending through the hub of the wheel W, a gear-wheel adapted to be moved into and out of gear with the rack-bars to impart a reciprocal motion thereto, and an actuating gear-wheel on the shaft of the rack-bar gear-wheel and in gear with the sector on the steering-bar, substantially as and for the purposes set forth.

13. The combination, with the rack-bars R' R², the steering-bar $b$, carrying the toothed sector 10, the spindle $k$, the wheel 9, rigidly secured to said spindle and in gear with sector 10, and the wheel 8, loose on said spindle, of the lever L, from which said wheel 8 is supported, an actuating-lever fulcrumed to the steering-bar or its handle, and a rod connecting the actuating-lever with the lever L for moving wheel 8 into or out of gear with the rack-bars, substantially as and for the purpose set forth.

In testimony whereof I affix my signature in presence of two witnesses.

ANDOR BODDING.

Witnesses:
 ALFRED J. BRYN,
 L. DAAE.